US006887610B2

(12) United States Patent
Elhamid et al.

(10) Patent No.: US 6,887,610 B2
(45) Date of Patent: May 3, 2005

(54) JOINING OF BIPOLAR PLATES IN PROTON EXCHANGE MEMBRANE FUEL CELL STACKS

(75) Inventors: Mahmoud H. Abd Elhamid, Warren, MI (US); Youssef M. Mikhail, Sterling Heights, MI (US); Richard H. Blunk, Macomb, MI (US); Daniel J. Lisi, Eastpointe, MI (US)

(73) Assignee: General Motors Corporation, Detroit, MI (US)

( * ) Notice: Subject to any disclaimer, the term of this patent is extended or adjusted under 35 U.S.C. 154(b) by 115 days.

(21) Appl. No.: 10/347,890

(22) Filed: Jan. 21, 2003

(65) Prior Publication Data

US 2004/0142224 A1 Jul. 22, 2004

(51) Int. Cl.[7] .............................. H01M 2/08; H01M 8/04
(52) U.S. Cl. ........................................... 429/35; 429/26
(58) Field of Search .............................. 429/34, 35, 36, 429/39, 38, 26

(56) References Cited

U.S. PATENT DOCUMENTS

| 5,776,624 | A | * | 7/1998 | Neutzler ...................... 429/26 |
| 6,057,054 | A | * | 5/2000 | Barton et al. ................. 429/42 |
| 6,099,984 | A | | 8/2000 | Rock ........................... 429/39 |
| 6,309,773 | B1 | | 10/2001 | Rock ........................... 429/34 |
| 6,358,642 | B1 | | 3/2002 | Griffith et al. ................ 429/34 |
| 6,372,376 | B1 | * | 4/2002 | Fronk et al. .................. 429/41 |
| 6,503,653 | B2 | | 1/2003 | Rock ........................... 429/35 |
| 2004/0058210 | A1 | * | 3/2004 | Elhamid et al. ............. 429/26 |

FOREIGN PATENT DOCUMENTS

| EP | 1009051 | * | 6/2000 |
| EP | 1284521 | * | 2/2003 |

* cited by examiner

*Primary Examiner*—Patrick Ryan
*Assistant Examiner*—Thomas H. Parsons
(74) *Attorney, Agent, or Firm*—Cary W. Brooks, Esq.; Linda M. Deschere, Esq.

(57) ABSTRACT

A bipolar plate assembly for a proton exchange membrane fuel cell stack advantageously connects electrically conductive plate surfaces, without the requirement to weld or braze the plate pairs. Each plate has alternating coolant channels and lands formed on an inside facing surface. An electrically conductive layer is deposited over at least the coolant channels and lands. Pairs of plates are aligned having facing electrically conductive layers. A fluid seal is disposed between the inside facing surfaces about a perimeter of the coolant channels. Each plate pair is compressed to form a plurality of electrical bond lines between adjacent lands within the perimeter seal. The perimeter seal prevents stack reactant gas oxygen from contacting and oxidizing the electrically conductive layer. A dielectric coolant is also used to reduce oxidation of the electrically conductive layer.

25 Claims, 5 Drawing Sheets

Fig. 5

JOINING OF BIPOLAR PLATES IN PROTON EXCHANGE MEMBRANE FUEL CELL STACKS

FIELD OF THE INVENTION

The present invention relates in general to fuel cell stacks and more specifically to an apparatus and method of construction of a bipolar plate for a proton exchange membrane fuel cell stack.

BACKGROUND OF THE INVENTION

Proton exchange membrane (PEM) fuel cell stacks are commonly configured having a plurality of fuel cell elements in a stacked configuration. The fuel cell elements commonly include a pair of PEM elements separated by a bipolar plate. Bipolar plates are commonly constructed having a pair of plates joined by adhesive seal, by brazing, and by welding.

Bipolar plates are commonly constructed with an upper plate and a lower plate. Both the upper plate and the lower plate include a plurality of reactant gas passages or grooves formed in the outer facing surfaces of the two plates. A plurality of coolant channels or portions of coolant channels are formed on the inner facing surfaces of the bipolar plates. When the two plate pairs are joined, the completed coolant channels are formed. Each of the coolant channels is normally separated by a plurality of lands. Electrical current is withdrawn from each of the bipolar plate assemblies; therefore, it is necessary that each of the pairs of plates forming a bipolar plate assembly be mechanically as well as electrically joined.

It is known to coat each of the interfacing surfaces (including the coolant channels) with an electrically conductive metal. Gold has been used for this purpose. The two plate halves can then be butted having the gold plated surfaces across the plurality of lands joined to electrically connect the bipolar plate assembly. A disadvantage of using gold for the plating material is both the thickness and the cost of the gold required for the plating. The gold is plated in approximately 25 $\mu$m thicknesses. If pressure alone is used to join the plate pairs to form a bipolar plate assembly, cost of the fuel cell stack is increased due to the cost of gold and the thickness of the gold plating material required to provide adequate land-to-land contact surface. Note that the reactants (humidified air) and coolants used in a typical PEM fuel cell stack can have a detrimental impact on plating materials used to plate the metallic surfaces of the plate pairs.

Uncoated metallic plates can also be used to form bipolar plate assemblies. The disadvantage of directly abutting uncoated metal plate pairs to form the bipolar plate assembly is that an oxidation layer quickly forms over the surfaces of each of the plate pairs before joining, which later inhibits electrical conductivity between the joined plate pairs.

It is therefore desirable to provide a bipolar plate assembly which reduces the cost associated with gold used as a plating material and which solves the potential problem of reactant gas and coolant contact with the plated surfaces adjacent to the coolant channels between the plate halves of a bipolar plate assembly.

SUMMARY OF THE INVENTION

According to a preferred embodiment of the present invention, a bipolar plate assembly for a proton exchange membrane (PEM) fuel cell stack is provided. The bipolar plate assembly includes a plate pair having plate facing surfaces. Each facing surface includes an inner portion and a peripheral outer portion. Each inner portion has an alternating plurality of both coolant grooves and coolant lands formed thereon. An electrically conductive layer is deposited over at least the coolant lands of each inner portion. The facing surfaces are joined to form both a plurality of electrical bond lines between respective facing joined lands, and a plurality of coolant channels between respective facing joined coolant grooves. A fluid seal is disposed between the inner portion and the peripheral outer portion of the facing surfaces, the fluid seal circumscribing each inner portion.

In a preferred embodiment, silver is plated over the entire surface of the inner portion of each plate to form the electrically conductive layer. Silver plating can also be applied over only the coolant lands, or over both the coolant lands and the coolant channels of the inner portions of both plate pairs. Gold can be substituted for silver plating material, however, silver is preferred over gold material for the electrically conductive layer to reduce plating material cost. The following are other preferred plating materials that can be substituted for either silver or gold: silver alloys, gold alloys, tin, tin alloys, lead and lead alloys.

The perimeter seal prevents a stack reactant gas from contacting and oxidizing the electrically conductive layer (e.g., the silver layer). The seal is preferably disposed around the entire perimeter of the inner portion of both facing surfaces of a bipolar plate pair. As a minimum, the seal circumscribes the coolant channels and lands to isolate the electrically conductive layer from the reactant gas(es) used in the fuel cell stack. The seal is preferably formed as a bead of either an electrically conductive or a non-electrically conductive adhesive. A bead of adhesive can be applied to either one plate of the bipolar plate pair or both plates. A gasket can also be used in place of the sealant. The perimeter seal is also applied to prevent the coolant from leaking out of the interior coolant channels.

To further reduce the potential for oxidation of the electrically conductive layer, a dielectric coolant is preferably used to cool the stack. An aqueous based solution can be used for the coolant, provided that the aqueous based solution is de-ionized prior to use and remains de-ionized throughout the life of the stack by means of an ion exchanger.

Further areas of applicability of the present invention will become apparent from the detailed description provided hereinafter. It should be understood that the detailed description and specific examples, while indicating several preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
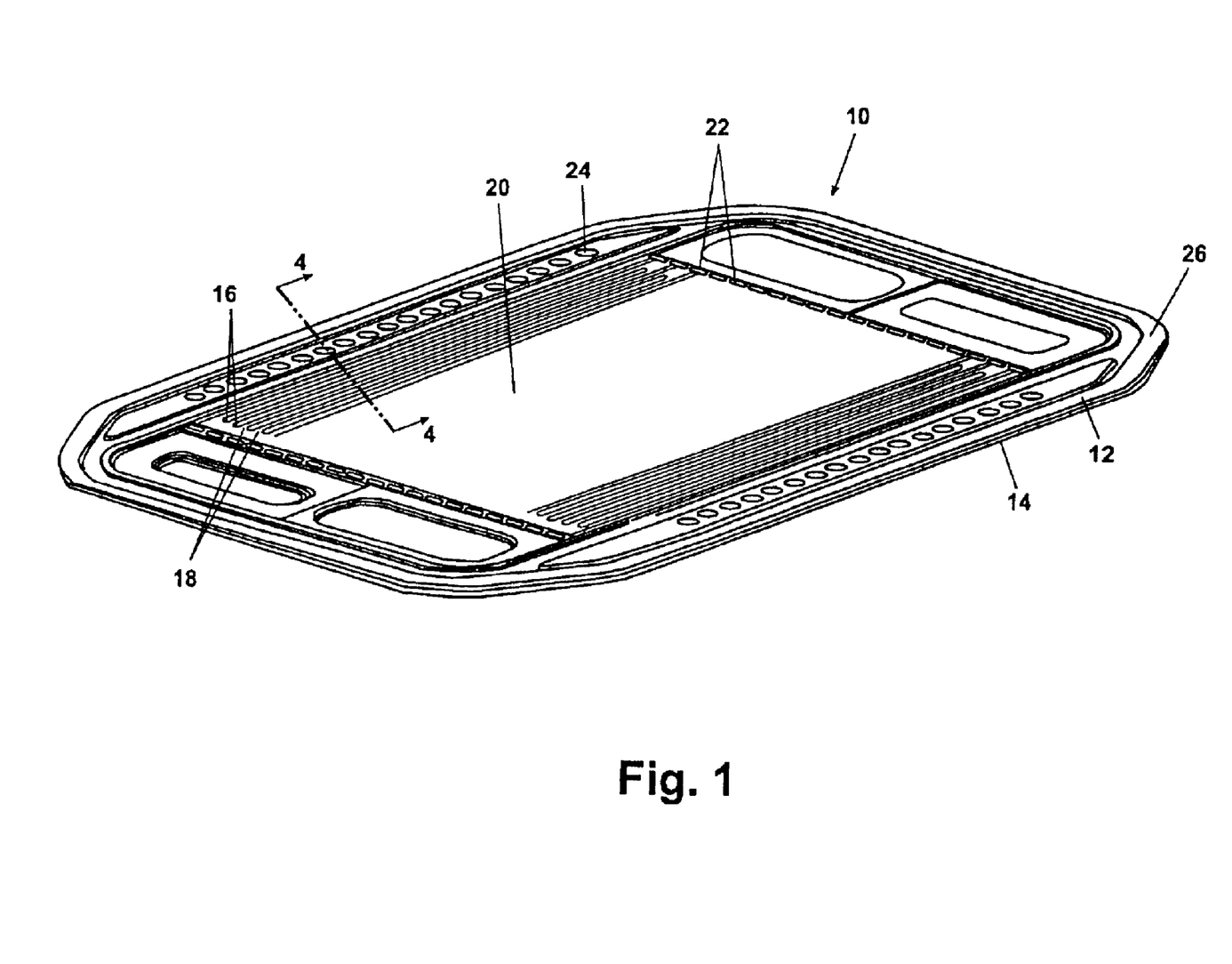
FIG. 1 is a perspective view of a preferred embodiment of the present invention joining two plate pairs to form a bipolar plate assembly.

Referring to FIG. 1, a bipolar plate assembly 10 of a preferred embodiment of the present invention is shown. The bipolar plate assembly 10 includes a first plate 12 and a second plate 14 forming a plate pair. A plurality of first plate reactant gas channels 16 are each separated by a plurality of first plate reactant gas lands 18 on a first plate outer surface 20 of the first plate 12. A similar plurality of reactant gas channels and lands are formed on an outer surface of the second plate 14 (shown in reference to FIGS. 4 and 5).

A plurality of reactant gas ports 22 and a plurality of coolant ports 24 are also disposed on the first plate outer surface 20. It is noted that a plurality of configurations of the reactant gas channels 16, the reactant gas lands 18, the reactant gas ports 22, and the coolant ports 24 can be provided. One skilled in the art will recognize that the present invention is not limited to a specific flow field design, but has application to bipolar plates of similar design independent of the flow field geometry.

Figure 2:
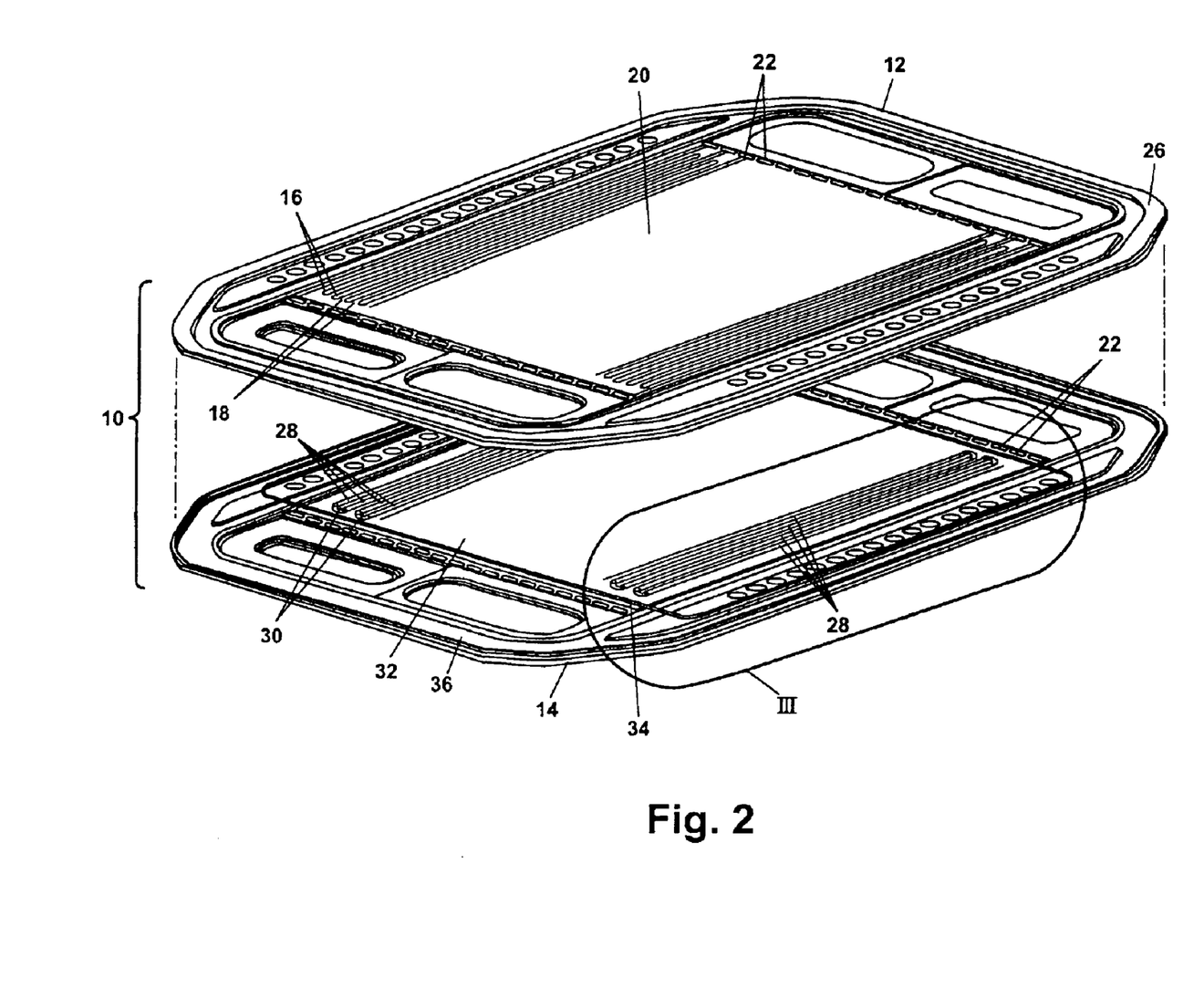
FIG. 2 is an exploded view of the bipolar assembly of FIG. 1 further showing a plurality of reactant gas channels and lands, a plurality of coolant channels and lands, and a seal disposed about a perimeter of the coolant channels.

Referring to FIG. 2, the bipolar plate assembly 10 of the present invention is shown in greater detail. The first plate 12 includes a first plate perimeter flange 26, used to form a perimeter of the bipolar plate assembly 10. Referring to second plate 14, a plurality of second plate coolant grooves 28 alternate between each of a plurality of second plate coolant lands 30 on a second plate inner portion 32. A mirror image of these features are provided on an inner portion of the first plate 12 (shown in reference to FIG. 4).

Figure 3:
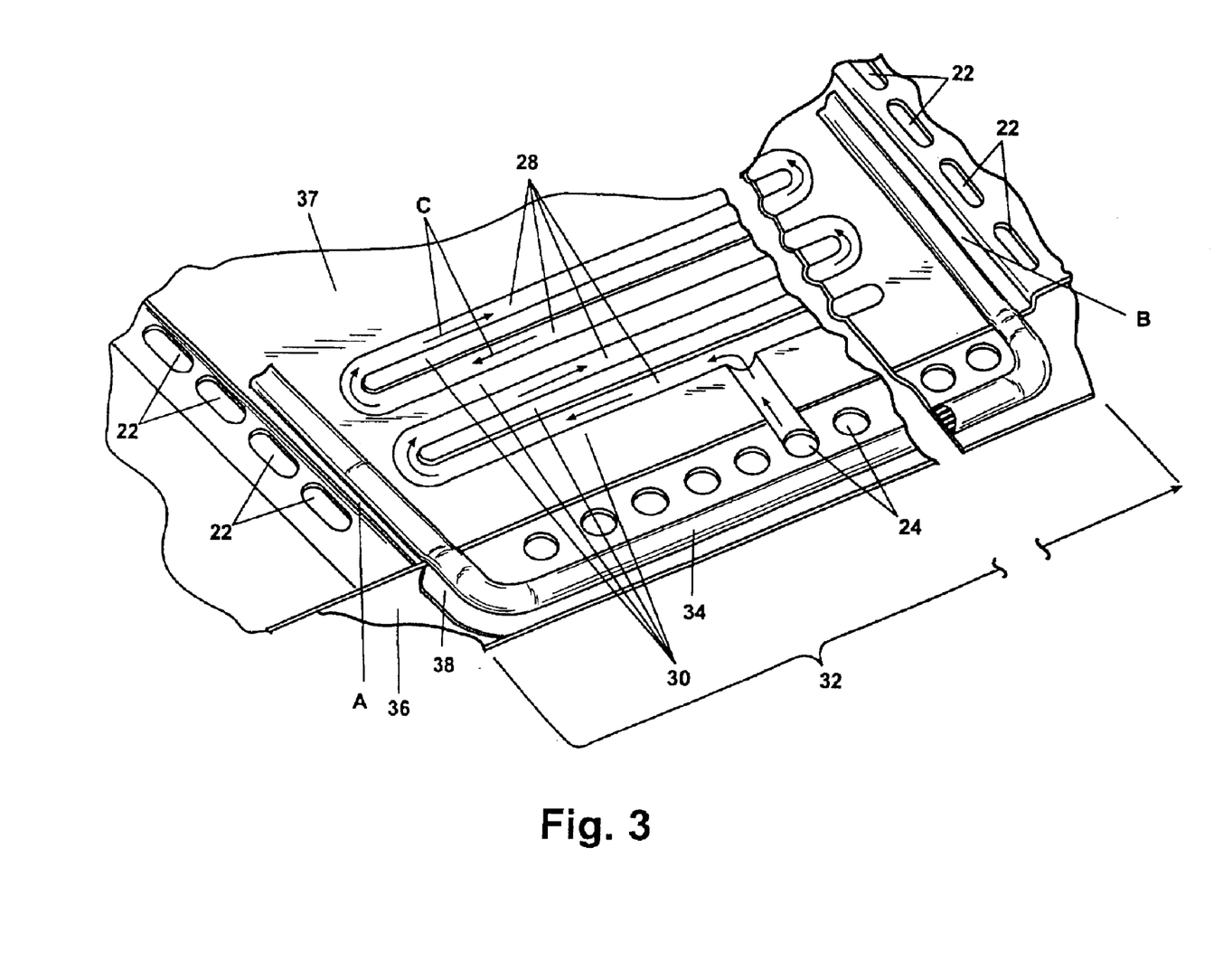
FIG. 3 is an exploded view of the coolant channel area III of FIG. 2 identifying an exemplary configuration of coolant channels divided by lands and the seal surrounding a perimeter of the coolant channel area.

A seal 34 (as best shown in FIG. 3) circumscribes a perimeter of the second plate coolant grooves 28 and the second plate coolant lands 30. The seal 34 will be discussed in greater detail in reference to FIG. 3. The seal 34 is positioned to prevent reactant gas flowing through the reactant gas ports 22 from contacting the second plate inner portion 32 (and a counterpart first plate 12 inner portion, not shown for clarity). The second plate inner portion 32 is therefore defined as the surface portion of the second plate 14 circumscribed by the seal 34. A second plate perimeter flange 36 abuts the first plate perimeter flange 26 when the bipolar plate assembly 10 is joined. An optional seal (not shown) provides a fluid-tight enclosure between the first plate 12 and the second plate 14 at the junction of the first plate perimeter flange 26 and the second plate perimeter flange 36.

Referring to FIG. 3, a section of the second plate inner portion 32 is shown in greater detail. Similar details for a first plate inner portion are not shown for clarity. The seal 34 is partially disposed along two edges, "A" and "B" of a second plate planar surface 37. The seal 34 is also disposed along a second plate raised surface 38 of the second plate perimeter flange 36. It is important to note the seal 34 is disposed on the second plate raised surface 38 exterior to the plurality of coolant ports 24. This further seals the second plate inner portion 32 from exposure to reactant gas. The seal 34 can be applied as a bead of sealant, or can be applied as a gasket. The seal 34 material can be a non-electrically conductive material or an electrically conductive material. The seal 34 isolates each of the second plate coolant grooves 28 and the second plate coolant lands 30 within the second plate inner portion 32, as well as similar coolant channels and lands of the first plate 12 (shown in reference to FIG. 4), from the plurality of reactant gas ports 22, and therefore from reactant gas supplied via the plurality of reactant gas ports 22 adjacent to the second plate inner portion 32. The reactant gas ports 22 supply reactant gas to the plurality of first plate reactant gas channels 16 on the first plate outer surface 20 (and similar reactant gas channels 44 shown in reference to FIG. 4).

Figure 4:
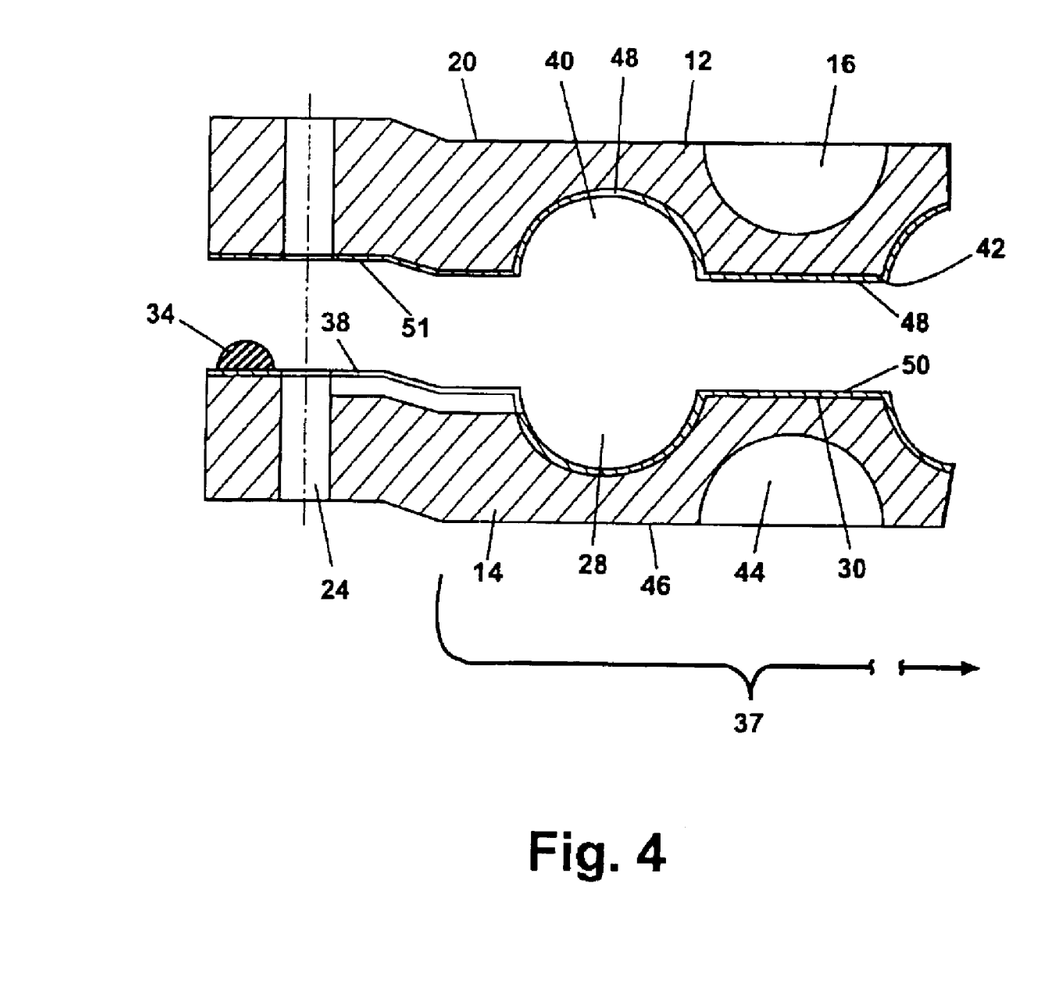
FIG. 4 is a partial sectioned elevation view taken along Section 4—4 of FIG. 1, showing a first plate and a second plate prior to joining into a bipolar plate assembly of the present invention.
Figure 5:
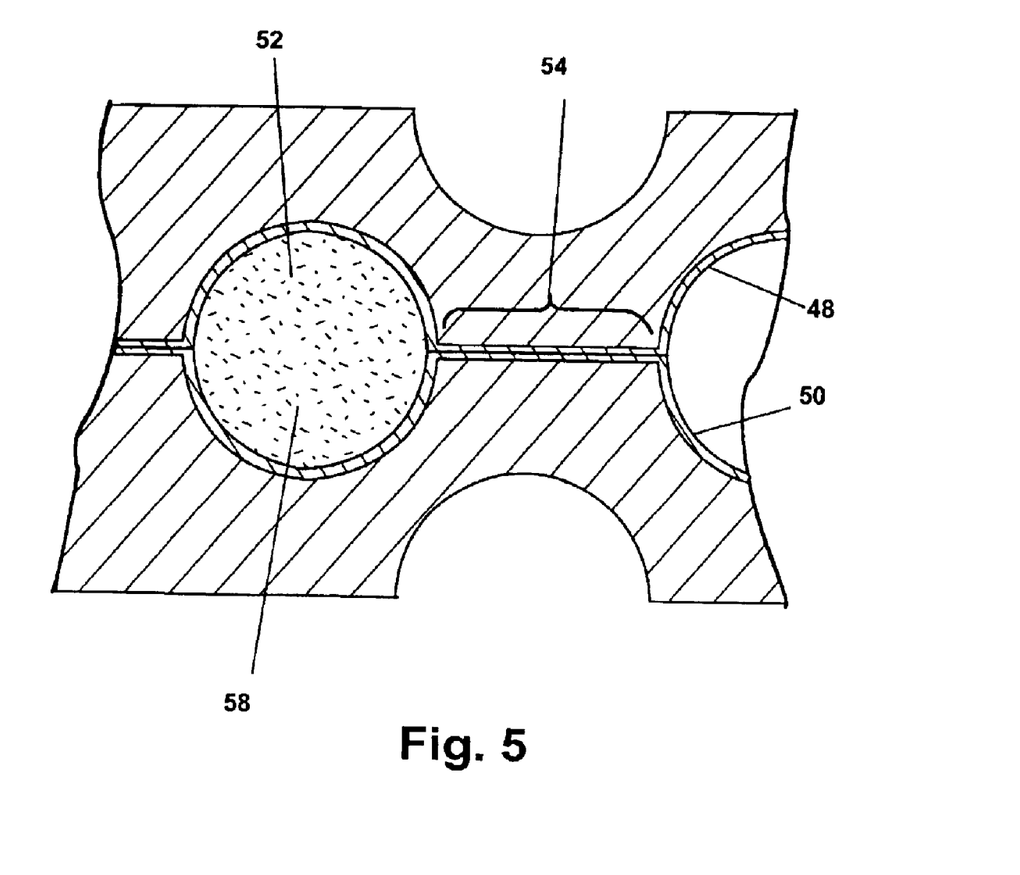
FIG. 5 is a partial sectioned elevation view similar to FIG. 4 following joining of the two plates to form a bipolar plate assembly of the present invention, further showing a dielectric coolant disposed in a coolant channel.

At a minimum, the surfaces of the second plate coolant lands 30 (and similar first plate coolant lands 42, shown in reference to FIGS. 4 and 5), are plated with an electrically conductive material. In a preferred embodiment, the entire surface of the second plate inner portion 32, (and the similar inner portion of the first plate 12), including both the coolant lands and the coolant grooves, are plated with the electrically conductive material (best shown in reference to FIGS. 4 and 5). The seal 34 isolates the surfaces plated by the electrically conductive material from reactant gas. The seal 34 is therefore preferably positioned to circumscribe the largest perimeter of the combination of the second plate planar surface 37 and the second plate raised surface 38 as possible.

Coolant is provided to the second plate coolant grooves 28 via one or more of the coolant ports 24. The seal 34 is extended to circumscribe at least a portion of the coolant ports 24 as necessary to isolate the reactant gas from the coolant channels, and to provide a coolant fluid seal. An exemplary coolant flow is shown by flow direction arrows "C". One skilled in the art will recognize that multiple coolant and reactant gas passage designs are possible. It is important, however, for any configuration of coolant channels/lands to have the coolant channels and lands isolated from reactant gas using the seal 34, to prevent reactant gas oxidation of the metallic plating applied to the coolant land and/or groove areas.

Referring now to FIG. 4, the first plate 12 and the second plate 14 are shown prior to assembly of the plates into a bipolar plate assembly 10 of the present invention. Each second plate coolant groove 28 aligns with a facing first plate coolant groove 40. Each second plate coolant land 30 aligns with a facing first plate coolant land 42. Each first plate reactant gas channel 16 aligns with an oppositely facing second plate reactant gas channel 44.

In the embodiment shown, the first plate outer surface 20 and a second plate outer surface 46 are not metallic (i.e., conductively) plated. Each first plate coolant groove 40 and each first plate coolant land 42 are coated with a first plate metallic plating 48. Similarly, the second plate coolant grooves 28 and the second plate coolant lands 30 are coated with a second plate metallic plating 50. The seal 34 is disposed over the second plate metallic plating 50 of the second plate raised surface 38. The seal 34 can also be disposed on the first plate indented surface 51, or a bead of the seal 34 can be disposed on both the first plate indented surface 51 and the second plate raised surface 38.

Referring to FIG. 5, when the first plate 12 and the second plate 14 are joined, adjoining ones of the second plate coolant grooves 28 and the first plate coolant grooves 40 form a plurality of coolant channels 52. At each adjoining location of a second plate coolant land 30 and a first plate coolant land 42, one of a plurality of electrical bond lines 54 are formed. Each electrical bond line 54 is formed by metal to metal contact between the first plate metallic plating 48 and the second plate metallic plating 50. Although it is not required, optionally a seal material is disposed between any of the electrical bond lines 54. In this case, the seal material is required to be an electrically conductive material. FIG. 5 also shows that a dielectric coolant 58 is flowing in the plurality of coolant channels 52. The dielectric coolant 58 is selected to further reduce the potential for oxidation of either the first plate metallic plating 48 or the second plate metallic plating 50. The dielectric coolant 58 can be a de-ionized, aqueous based coolant or a hydrocarbon based coolant.

The material for the first plate metallic plating 48 and the second plate metallic plating 50 is preferably silver or a silver alloy material. Using assembly pressures for the bipolar plate assembly within a fuel cell stack ranging from approximately 25 psi to approximately 400 psi, silver plating material produces an electrical bond line resistance of 3 milli-ohms X centimeter squared (milli-ohms $cm^2$) or less and in general provides electrical bond line resistances equal to or lower than that of gold. Table 1 below provides a comparison of bond line resistances measured at stack compression pressures ranging from 5 psi to 200 psi for several bipolar plate materials.

TABLE 1

| | Bond line resistance, m-ohms $cm^2$ | | | |
|---|---|---|---|---|
| Compression Pressure, psi | SS(Ag)/(Ag)SS | graphite/graphite | SS(Au)/(Au)SS | SS/SS |
| 200 | 0.14 | 0.9 | 0.4 | 20.8 |
| 100 | 0.25 | 1.34 | 0.72 | 27.1 |
| 50 | 0.61 | 3.7 | 1.1 | 34 |
| 25 | 1.2 | 7.2 | 3.1 | 40 |
| 5 | 4.6 | 36.5 | 18.1 | 179 |

Referring to Table 1, four groups of bipolar plates are described. In a first column, a 316L stainless steel bipolar plate having silver plated facing surfaces includes bond line resistances measured in milli-ohms X centimeter squared over a range of stack compression pressures. In a second column, a graphite to graphite bipolar plate combination produces generally higher bond line resistances between the graphite plates. In a third column, a 316L stainless steel having gold plated facing surfaces forming a bipolar plate assembly of the present invention is shown. Bond line resistances are generally higher for the gold plated bipolar plate assembly than the silver plated bipolar plate assembly up to approximately the 200 psi compression range. In a fourth column of Table 1, an uncoated combination of stainless steel to stainless steel plates is shown over a plate compression range of 5 psi to 200 psi. Bond line resistances are significantly greater than the silver or gold plated stainless steel to stainless steel plate bipolar plate assemblies. The higher bond line resistances for the unplated condition occur due to a passive film which forms on the stainless steel upon exposure to oxygen. A bond line resistance of 3 milli-ohms X centimeter squared or less is not achieved for any of the compression pressures shown in Table 1 for the uncoated stainless steel to stainless steel bipolar plate assembly.

Table 1 shows that silver plating a stainless steel to stainless steel bipolar plate assembly provides the lowest overall bond line resistance at all compression pressures of 200 psi and lower. At a compression pressure of 200 psi the silver plated stainless steel bipolar plate assembly has a similar bond line resistance to the graphite and the gold plated stainless steel bipolar plate assemblies, but still provides a lower overall bond line resistance. The bond line resistance for silver plated stainless steel bipolar plate assemblies, however, is contingent on preventing oxygen from contacting the silver plating and oxidizing the silver plating material. It is therefore desirable to use a combination of a dielectric coolant in the coolant flow channels in addition to a seal on the perimeter of the plated surfaces of the bipolar plate assembly of the present invention. An additional benefit of silver plating a bipolar plate assembly of the present invention derives from the thickness of the silver plating used. A thickness of approximately 10 nanometers of silver and greater can be used while achieving the bond line resistances of Table 1. This contrasts with the approximately 25 $\mu$m thickness of gold known in the art for this application.

A 316L stainless steel is described herein as the base material plate for a bipolar plate assembly of the present invention. Any other metal or non-metal plate material can also be used which is capable of being plated by the metallic plating materials of the present invention. It is noted that Table 1 identifies that gold plating can also be used to achieve acceptable bond line resistance values in a bipolar plate assembly of the present invention (i.e., at a compression pressure of approximately 25 psi and higher). Gold plating in combination with the sealing material provided on a perimeter of the coolant channels and with a dielectric coolant also provides acceptable bond line resistance values.

Alternate materials to both gold and silver plating can also be used. Alloys of silver, alloys of gold, tin, alloys of tin, lead, and alloys of lead also provide bond line resistance values of 3 milli-ohms X centimeter squared and less using the bipolar plate assembly of the present invention.

Dielectric stack coolants can also include hydrocarbon based liquids and de-ionized water. Examples of hydrocarbon based liquids which are acceptable for use include kerosene and an aqueous based version of kerosene having a micro-volume of water (water-in-hydrocarbon emulsions).

Bipolar plate assemblies are also provided with channels joining the coolant or the reactant gas flow ports with the individual channels formed on the surfaces of the bipolar plate pairs. A sealant similar to the seal 34 is also required between these linking passages and the coolant flow channels of the bipolar plate assembly of the present invention.

The metallic plating applied to both of the facing plate sides forming the bipolar plate assembly of the present invention can be applied using any commercially available process including electro-plating, electro-less plating, and physical vapor deposition. In a preferred embodiment, physical vapor deposition of the metallic plating is preferred to provide a uniform thin layer of metallic plating suitable for electrical bond lines. Using the physical vapor deposition process, a metallic plating thickness of approximately 10 nanometers and greater is possible. The present invention is not limited to a maximum thickness of the metallic plating, therefore metallic plating ranging from 10 to greater than 100 nano-meters can be used. A thin plating is desirable to reduce the overall plating material cost and processing cost. To further limit the cost of the metallic plating, only the land surfaces of both of the plates forming the bipolar plate assembly require plating.

Joining the plate pairs to form a bipolar plate assembly of the present invention provides a "low" bond line resistance, defined herein as a bond line resistance of approximately 3 milli-ohms X centimeter squared or lower. When the plate pairs of the present invention are combined into a fuel cell stack, a pressure nominally ranging from approximately 25 pounds per square inch (psi) to approximately 400 psi can be applied to the stack components. As shown in Table 1 herein, a lowest acceptable joining pressure occurs between approximately 5 psi and 25 psi, using silver plating material, to provide an acceptable bond line resistance between the adjacent pairs of plates. Pressures above 200 psi also provide acceptable bond line resistances, however a desirable range of pressures for joining the bipolar plate assemblies of the present invention into a fuel cell stack is preferably maintained below 200 psi to reduce the potential to damage stack components.

Based on the reduced bond line resistance achieved using a bipolar plate of the present invention, the percentage of adjacent land pairs between facing plates which are required to mate to achieve effective electrical contact (i.e., bond line resistance at or below 3 milli-ohms X centimeter squared), can be reduced below 100%. Effective electrical contact between the first and second plates is provided with a combined contact surface, (i.e., the total number of adjacent pairs of lands which electrically join compared to the total available number of adjacent pairs of lands between facing plate pairs) of approximately 25% or greater. This capability provides the benefit of assembling the bipolar plate assemblies of the present invention into a fuel cell stack using a lower compression force. A lower compression force used when joining the bipolar plate assemblies into a fuel cell stack improves the overall durability of the stack. Higher stack compression pressures can result in fusion paper contact apertures formed in the MEA.

The bipolar plate assembly of the present invention offers several advantages. By sealing the perimeter of the coolant channel portions of a bipolar plate assembly, oxygen from the reactant gas is prevented from contacting and oxidizing the metallic plating. Silver, lead or tin plating can be used in addition to gold. By using silver plating material, the plating cost of the plate pairs is reduced, while bond line resistance is also reduced. Reduced bond line resistance provides the benefits of lower contact pressure to join the plate pairs and acceptable electrical contact area provided with a reduced quantity of contacting lands.

The description of the invention is merely exemplary in nature and, thus, variations that do not depart from the gist of the invention are intended to be within the scope of the invention. For example, the first plate 12 and the second plate are shown in FIG. 4 having either a raised surface or an indented surface exterior to the coolant grooves. The geometry of the first plate 12 and the second plate 14 can vary from that shown provided that the coolant channels/lands can be isolated from reactant gas in the stack. Multiple coolant ports are shown. Any quantity of coolant ports can be used, with any combination of groove designs and supply channels. The coolant grooves and lands are shown formed on a planar surface. A planar surface is not required provided adjacent lands between facing plates can be joined to form the one or more electrical bond lines. Such variations are not to be regarded as a departure from the spirit and scope of the invention.

What is claimed is:

1. A bipolar plate assembly comprising:
 a plate pair having plate facing surfaces, each said facing surface including an inner portion and a peripheral outer portion;
 each said plate having a reactant gas distribution surface opposite said facing surface;
 each said inner portion having an alternating plurality of both coolant grooves and lands formed thereon;
 an electrically conductive layer deposited over at least said lands of each said plate;
 said facing surfaces joined to form both a plurality of electrical bond lines between respective facing pairs of said lands and a plurality of coolant channels between respective facing pairs of said coolant grooves; and
 a fluid seal disposed between said inner portion and said peripheral portion of said facing surfaces, said fluid seal circumscribing each said inner portion to inhibit crossover of said reactant gas into said inner portion.

2. The assembly of claim 1, wherein said electrically conductive layer comprises metal selected from the group consisting of silver, silver alloy, gold, gold alloy, lead, lead alloy, tin, and tin alloy.

3. The assembly of claim 2, wherein said electrically conductive layer has a minimum thickness for said silver of approximately ten nanometers.

4. The assembly of claim 1, wherein said inner portion further comprises a plurality of coolant ports in fluid communication with said coolant channels to provide both an inflow and an outflow of coolant through said coolant channels.

5. The assembly of claim 4, further comprising an extended plate area perforated by said coolant ports wherein said fluid seal is extendable to further circumscribe said coolant ports.

6. The assembly of claim 1, wherein said peripheral outer portion further comprises a plurality of reactant gas ports.

7. The assembly of claim 6, further comprising:
 said plate pair includes outwardly exposed surfaces each having a plurality of reactant gas passages formed thereon, each said reactant gas passage in fluid communication with at least one of said reactant gas ports; and
 wherein said fluid seal operably isolates said inner portion from said reactant gas passages and said reactant gas ports.

8. The assembly of claim 1, wherein said fluid seal is selected from the group consisting of an electrically conductive adhesive, an electrically non-conductive adhesive, and a gasket.

9. A fuel cell stack comprising:
 a plurality of membrane electrode assemblies arranged in a stacked configuration;
 a bipolar plate assembly disposed between respective pairs of said membrane electrode assemblies, each said bipolar plate assembly including a pair of aligned plates each having a plurality of reactant gas channels on a first surface facing said membrane electrode assemblies, and a plurality of alternating coolant grooves and lands on a second surface facing away from said membrane electrode assemblies;
 each said second surface having an electrically conductive layer deposited over at least said lands;
 each said bipolar plate assembly joined to form both a plurality of electrical bond lines between respective facing pairs of said lands and a plurality of coolant channels between respective facing pairs of said coolant grooves; and
 a fluid seal between respective said second surfaces of said aligned plates and circumscribing said coolant channels and said lands of said respective plates to isolate said reactant gas channels from said electrically conductive layer.

10. The fuel cell stack of claim 9, further comprising a dielectric coolant disposed within said coolant channels.

11. The fuel cell stack of claim 10, wherein said dielectric coolant comprises a de-ionized, aqueous based fluid.

12. The fuel cell stack of claim 10, wherein said dielectric coolant comprises a hydrocarbon based fluid.

13. The fuel cell stack of claim 9, wherein said electrically conductive layer further comprises a silver containing material having a minimum plating thickness of approximately 10 nanometers.

14. The fuel cell stack of claim 9, wherein said electrically conductive layer comprises metal selected from the group consisting of silver, silver alloy, gold, gold alloy, lead, lead alloy, tin, and tin alloy.

15. The fuel cell stack of claim 9, further comprising
a stack construction pressure ranging from approximately 25 pounds per square inch to approximately 400 pounds per square inch; and
a minimum combined contact surface of approximately 25%.

16. The fuel cell stack of claim 9, further comprising a plurality of reactant gas ports disposed adjacent to both said coolant channels and said lands wherein said fluid seal is disposed between said reactant gas ports and both said coolant channels and said lands.

17. A method of isolating reactant gas passages from coolant contacting surfaces in a fuel cell stack comprising the steps of:
forming alternating coolant grooves and lands on facing interior surfaces of a plurality of plate pairs;
providing a plurality of reactant gas passages on exterior surfaces of said plurality of plate pairs;
conductively plating at least said lands of said facing surfaces;
aligning both said facing surfaces to form pairs of facing lands;
sealing a perimeter of said facing surfaces of each plate pair to isolate said coolant grooves and lands from said reactant gas passages; and
joining said plurality of plate pairs to electrically couple said facing lands between each said plate pair.

18. The method of claim 17, wherein said aligning step further comprises forming at least one coolant channel from said coolant grooves.

19. The method of claim 18, comprising flowing a dielectric coolant within said coolant channels.

20. The method of claim 19, comprising de-ionizing an aqueous based coolant to form said dielectric coolant.

21. The method of claim 18, wherein said sealing step comprises circumscribing at least said lands with a continuous seal to isolate a reactant gas dispersed within said reactant gas passages from said lands.

22. The method of claim 17, wherein said joining step comprises applying a compression force ranging from approximately 25 pounds per square inch to approximately 200 pounds per square inch.

23. A bipolar plate assembly comprising:
a plate pair having plate facing surfaces, each said facing surface including an inner portion and a peripheral outer portion;
each said inner portion having an alternating plurality of both coolant grooves and lands formed thereon;
each said peripheral outer portion having at least one reactant port for supplying a reactant gas;
an electrically conductive layer deposited over at least said lands of each said plate;
said facing surfaces joined to form both a plurality of electrical bond lines between respective facing pairs of said lands and a plurality of coolant channels between respective facing pairs of said coolant grooves; and
a fluid seal disposed between said inner portion and said peripheral outer portion of said facing surfaces, said fluid seal circumscribing each said inner portion to inhibit crossover of said reactant gas into said inner portion.

24. A fuel cell stack comprising:
a plurality of membrane electrode assemblies arranged in a stacked configuration;
a bipolar plate assembly disposed between respective pairs of said membrane electrode assemblies, each said bipolar plate assembly including a pair of aligned plates each having a plurality of reactant gas channels on a first surface facing said membrane electrode assemblies and a plurality of reactant gas ports supplying reactant gas to said reactant gas channels, and having a plurality of alternating coolant grooves and lands on a second surface facing away from said membrane electrode assemblies;
each said second surface having an electrically conductive layer deposited over at least said lands;
each said bipolar plate assembly joined to form both a plurality of electrical bond lines between respective facing pairs of said lands and a plurality of coolant channels between respective facing pairs of said coolant grooves; and
a fluid seal between said ports and said coolant channels and said lands of each said bipolar plate assembly to isolate said reactant gas from said electrically conductive layer.

25. A method of isolating reactant gas passages from coolant contacting surfaces in a fuel cell stack comprising the steps of:
forming alternating coolant grooves and lands on facing interior surfaces of a plurality of plate pairs;
providing a plurality of reactant gas passages on exterior surfaces of said plurality of plate pairs and providing at least one reactant port for supplying a reactant gas;
conductively plating at least said lands of said facing surfaces;
aligning both said facing surfaces to form pairs of facing lands;
sealing a perimeter of said facing surfaces adjacent said port of each plate pair to isolate said coolant grooves and lands from said reactant gas; and
joining said plurality of plate pairs to electrically couple said facing lands between each said plate pair.

* * * * *